United States Patent
Kozub et al.

(10) Patent No.: US 10,389,936 B2
(45) Date of Patent: Aug. 20, 2019

(54) FOCUS STACKING OF CAPTURED IMAGES

(71) Applicants: Danylo Kozub, Kharkov (UA); Iurii Shapoval, Kharkov (UA)

(72) Inventors: Danylo Kozub, Kharkov (UA); Iurii Shapoval, Kharkov (UA)

(*) Notice: Subject to any disclaimer, the term of this patent is extended or adjusted under 35 U.S.C. 154(b) by 75 days.

(21) Appl. No.: 15/448,621

(22) Filed: Mar. 3, 2017

(65) Prior Publication Data

US 2018/0253877 A1    Sep. 6, 2018

(51) Int. Cl.
*H04N 5/232* (2006.01)
*G06T 7/11* (2017.01)
*G06T 5/00* (2006.01)
*G06T 5/50* (2006.01)
*G06T 7/571* (2017.01)

(52) U.S. Cl.
CPC ........ *H04N 5/23229* (2013.01); *G06T 5/002* (2013.01); *G06T 5/50* (2013.01); *G06T 7/11* (2017.01); *G06T 7/571* (2017.01); *H04N 5/232133* (2018.08); *G06T 2200/21* (2013.01); *G06T 2207/10016* (2013.01); *G06T 2207/10028* (2013.01); *G06T 2207/10068* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS 9,292,926 B1    3/2016  Tang et al.
9,307,222 B1*   4/2016  Tang ................. H04N 5/23222
2009/0039233 A1  2/2009  Hiraga
2011/0169985 A1  7/2011  Cooper
2011/0221953 A1* 9/2011  Pollard ................... G02B 7/36
                                                        348/345

(Continued)

FOREIGN PATENT DOCUMENTS

WO    2014083574 A2    6/2014

OTHER PUBLICATIONS

Yao, Yi, et al. "Evaluation of sharpness measures and search algorithms for the auto focusing of high-magnification images." Visual Information Processing XV. vol. 6246. International Society for Optics and Photonics, 2006.*

*Primary Examiner* — Kim Y Vu
*Assistant Examiner* — Nathan J Bloom

(57) ABSTRACT

A digital image processing, in particular to the method of producing the output image with extended depth of field from a group of source images of the same scene, captured with a shift of depth of field. The method of producing the output image with extended depth of field form a group of at least two source images of substantially the same scene captured with a shift of depth of field, comprises determining focus measures of source image pixels; generation of a depth map with elements comprising source image indices; smoothing of the depth map in a way that the degree of smoothing of source image indices it contains is inversely proportional to the corresponding focus measure values; producing an output image using the smoothed depth map. A computer system that implements said method, and a computer readable medium comprising program instructions allowing for implementing said method.

12 Claims, 5 Drawing Sheets

(56) References Cited

U.S. PATENT DOCUMENTS

| | | | |
|---|---|---|---|
| 2012/0098947 A1 | 4/2012 | Wilkes | |
| 2012/0188389 A1* | 7/2012 | Lin | H04N 5/2258 348/218.1 |
| 2013/0094753 A1* | 4/2013 | Voss | G06T 5/002 382/154 |
| 2013/0307966 A1 | 11/2013 | Komatsu | |
| 2014/0022346 A1 | 1/2014 | Liu et al. | |
| 2014/0085515 A1* | 3/2014 | Blayvas | H04N 5/2356 348/242 |
| 2014/0092294 A1* | 4/2014 | Iwabuchi | H04N 5/3456 348/349 |
| 2015/0029311 A1* | 1/2015 | Cheng | H04N 5/23229 348/46 |
| 2015/0062370 A1 | 3/2015 | Shroff et al. | |
| 2015/0104074 A1 | 4/2015 | Vondran, Jr. et al. | |
| 2015/0116353 A1* | 4/2015 | Miura | G06T 11/60 345/632 |
| 2015/0279012 A1 | 10/2015 | Brown et al. | |
| 2015/0286044 A1* | 10/2015 | Rout | G02B 21/367 348/79 |
| 2016/0307368 A1* | 10/2016 | Akeley | G06T 9/00 |
| 2017/0006270 A1* | 1/2017 | Demoulin | H04N 1/56 |

* cited by examiner

FOCUS STACKING OF CAPTURED IMAGES

FIELD OF THE INVENTION

The invention relates to digital image processing, in particular to the method of producing an output image with extended depth of field from a series of source images depicting the same scene captured with a shift of depth of field. "Depth of field" should be understood to mean the area in the scene that appears acceptably sharp.

BACKGROUND OF THE INVENTION

In certain conditions, it is difficult to capture image keeping the entire subject in focus. For instance, photos of innards in endoscopy may comprise regions located at substantially different distances from the camera lens and exceeding the focal depth of the image capture device. As a result, at least one region in the obtained images will be out of focus.

Focus stacking is a tool allowing to extend the depth of field of a digital image. This technique is based on merging multiple source images of the same scene captured, as a rule, from the same viewpoint and with different position of depth of field (for instance, a set of static images taken from a fixed viewpoint, or a series of frames from a fixed video camera) in order to produce an output image with the depth of field larger than on each individual image. That is to say that individual source images being merged provide the necessary data for creation of a composite output image with more or all of the parts of the subject in focus. Focus stacking may be used in different cases when individual images have relatively shallow depth of field, for instance, in macro photography, optical microscopy, landscape photography etc.

There are several ways to perform focus stacking, one of them is the method based on generation of a depth map. In their turn, known methods of performing focus stacking based on depth map use different techniques for detecting depth of field and improving quality of the depth map based thereon. But efficiency of these methods is often low, the methods themselves being controversial due to their high computational complexity. For instance, the patent claim WO2014083574 describes focus stacking technique based on the depth map that is in its turn created on the basis of an energy matrix. In order to produce a better result, the depth map is modified in the zones corresponding to low contrast regions with noise, using fixed focus measure value (cutoff threshold) for determining low contrast regions for their further cutoff. But implementation of the above mentioned technique causes visual artifacts in the output image, and said fixed value is to be preliminarily determined and adjusted.

SUMMARY OF THE INVENTION

According to the present invention, the problem of the prior art is solved by producing an output image with extended depth of field from a group of at least two source images of substantially the same scene captured with a shift of depth of field, by determining focus measures of the source image pixels; generation of a depth map with elements comprising source image indices; smoothing of the depth map in a way that the degree of smoothing of source image indices it contains is inversely proportional to the corresponding focus measure values; and producing an output image using the smoothed depth map.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF THE INVENTION

Figure 1:
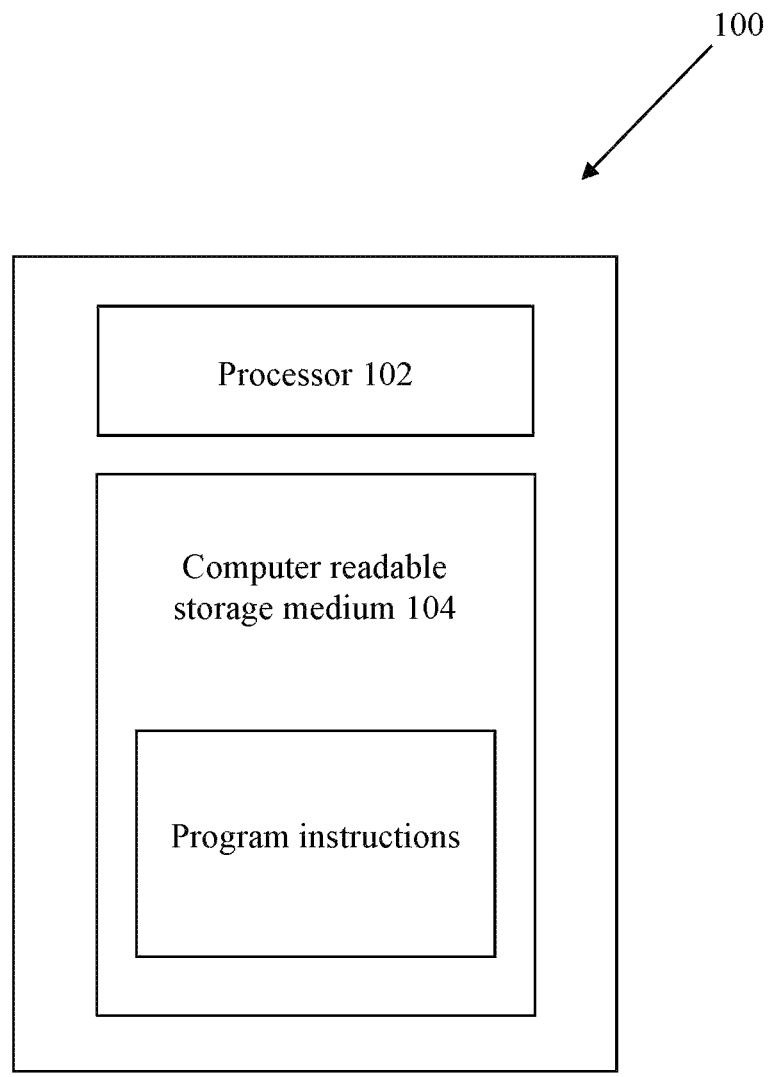
FIG. 1 is a pictorial diagram of an example embodiment of a computer system implementing the method according to the present invention.

Various known focus stacking techniques based on depth map use different methods of detecting depth of field and improving quality of the depth map based thereon. Though efficiency of these techniques is often quite low, and the methods themselves are controversial due to their high computational complexity.

According to the present invention there is provided a method of creation of the output image with extended depth of field from a group of at least two source images of substantially the same scene captured with a shift of depth of field, that includes determining focus measures of source image pixels; generation of the depth map with elements containing source image indices; smoothing of the depth map in a way that the degree of smoothing of source image indices it contains is inversely proportional to the corresponding focus measure values; producing the output image using the smoothed depth map.

Smoothing with the degree depending on certain weights (in this case—on focus measures) can be implemented in different ways. For instance, depth map smoothing can be performed using convolution with variable kernel (matrix) size. This specific kind of smoothing can be performed, for instance, by applying multiple Gaussian blurs of different intensity (kernel size) for different elements. Described depth map smoothing can be performed by other methods known to the one skilled in the art or in any other way that would ensure the necessary result.

In particular, depth map smoothing using focus measures can be implemented as a process with each depth map element being distributed (projected) according to a certain distribution principle and accumulated in the elements of the smoothed depth map. In course of even smoothing of the depth map each element of the depth map is distributed over the elements of the smoothed depth map according to the same distribution function (for instance, as a Gaussian distribution). Smoothing of the depth map according to the described method of the present invention, i.e. the method with the smoothing degree depending on the weights, in particular, on focus measures, results in the distribution shape being different for different elements of the unsmoothed depth map and depending on the weight (corresponding focus measure value): if the weight is high, the smoothing degree is low, if the weight is low, the smoothing degree is high. After distribution of all of the depth map elements, the smoothed depth map can be normalized in order to take into account the different number of depth map elements used for each element of the smoothed depth map.

In particular, normalization can be performed by smoothing of the normalizing image (matrix with every element being equal to 1) in the same way and with the same weights that have been used for smoothing of the depth map, and by further dividing each element of the smoothed depth map by the corresponding element of the smoothed normalizing image.

Smoothing of the depth map according to the method described above allows to greatly smooth low-contrast background and slightly smooth sharp regions of the image, thus the boundaries between the objects in the output image stay almost unsmoothed, while noise within the low-contrast region is effectively smoothed. Besides that, the method according to the present invention does not require establishing cut-off threshold and, therefore, is implemented automatically. The output image with extended depth of field can represent an image with depth of field larger than in any of the source images. The output image can also be all-focused, which means that all of the objects in it are in focus. By depth of field is meant the zone in the image where the objects appear subjectively sharp.

Source images taken with a shift of depth of field can be represented by images captured in a way that depth of field of each subsequent source image is shifted in one and the same direction, i.e. captured with gradual shift of depth of field.

In the preferred embodiment of the present invention determining focus measures includes smoothing of source images and creation of intermediate images with pixel brightness calculated on the basis of absolute difference in brightness of the corresponding pixels of smoothed and source images. Generated intermediate image can be smoothed. Hence, focus measures are the obtained values of intermediate or intermediate smoothed image pixel brightness. And the intermediate image can be produced by any method known in the prior art, non-limiting examples of which include high pass filter or difference of Gaussians, as well as by any methods that would ensure the necessary result.

In the preferred embodiment of the present invention the elements of the depth map contain indices of source images that comprise pixels from the group of corresponding pixels of source images with the maximum focus measure value.

In the preferred embodiment of the present invention pixels of the output image are obtained on the basis of corresponding pixels of source images, their indices differing from the corresponding indices of the smoothed depth map by no more than 1. This means that one corresponding pixel of the source image (for integer index in the smoothed depth map) or two corresponding pixels of adjacent source images (for fractional (non-integer) index value in the smoothed depth map) can be used to create a pixel of the output image. The phrase 'are obtained on the basis of' means that apart from the pixels of source images described above (either one or two) obtained using smoothed depth map, in one of the embodiments of the present invention, the pixel of the output image can be created using also the other corresponding pixels of source images, their indices being obtained, for instance, on the basis of the corresponding indices of the unsmoothed depth map. Focus measures of corresponding pixels of source images can also be additionally used for generation of the output image pixels. This is possible when at least three source images are available.

The present invention is described herein directly through a computer-implemented method of producing of the output image with extended depth of field, as well as through a computer system with program instructions implementing said method, and a computer readable medium storing said program instructions that initiate implementation of the aspects of the output image creation according to the present invention.

The aspects of the present invention are described herein with reference to the drawings.

FIG. 1 depicts an example of a computer system that can implement the claimed method of creation of the output image with extended depth of field. On the illustrated example, the computer system 100 comprises a processor 102 and a computer readable medium 104 communicatively connected to the processor 102. The computer readable medium stores program instructions executable by said processor 102 and initiating generation of the output image with extended depth of field from a group of at least two source images of substantially the same scene captured with a shift of depth of field.

The program instructions described herein are executable by at least one or several hardware logic components. Examples of possible types of hardware logic components that can be used (without limitation) include field-programmable gate arrays (FPGAs), application-specific integrated circuits (ASICs), systems-on-a-chip (SOCs), complex programmable logic devices (CPLDs), etc.

Program instructions for carrying out operations of the present invention may be represented by assembler code instructions, instruction-set-architecture (ISA) instructions, machine instructions, machine-dependent instructions, set of micro commands, base software instructions, state data, or another source code or object code written in any combination of one or more programming languages, including object oriented programming languages such as Smalltalk, C++ or the like, and conventional procedural programming, languages such as C or C-like programming languages.

The program instructions may be executed entirely on the user's computer, partly on the user's computer as a stand-alone software package, partly on the user's computer and partly on a remote computer or entirely on the remote computer or server. In the latter scenario, the remote computer may be connected to the user's computer through any type of network, including local area network (LAN) and wide area network (WAN), or it can be connected to an external computer (for example, through the Internet using an Internet Service Provider).

In some embodiments, for example, in electronic circuitry, programmable logic devices, field-programmable gate arrays (FPGA), or programmable logic arrays (PLA) can execute computer readable program instructions optimizing the information about the state of such instructions for adjustment of electronic circuitry in order to implement the aspects of the present invention.

The computer readable medium includes volatile and non-volatile, removable and non-removable media applicable in any method or technology of storing such information as computer readable instructions, data structures, program modules, etc.

Computer readable medium may include random access memory (RAM), read-only memory (ROM), electrically-erasable programmable ROM (EEPROM), flash memory or another memory technology, CD-ROM, DVD format compact disc or another optical storage, magnetic cassettes, magnetic tape, magnetic disk storage or other magnetic storage devices, as well as any other non-transmission medium that can be used to store information for access by a computing device. Said computer readable storage medium is a non-transitory one.

Figure 2:
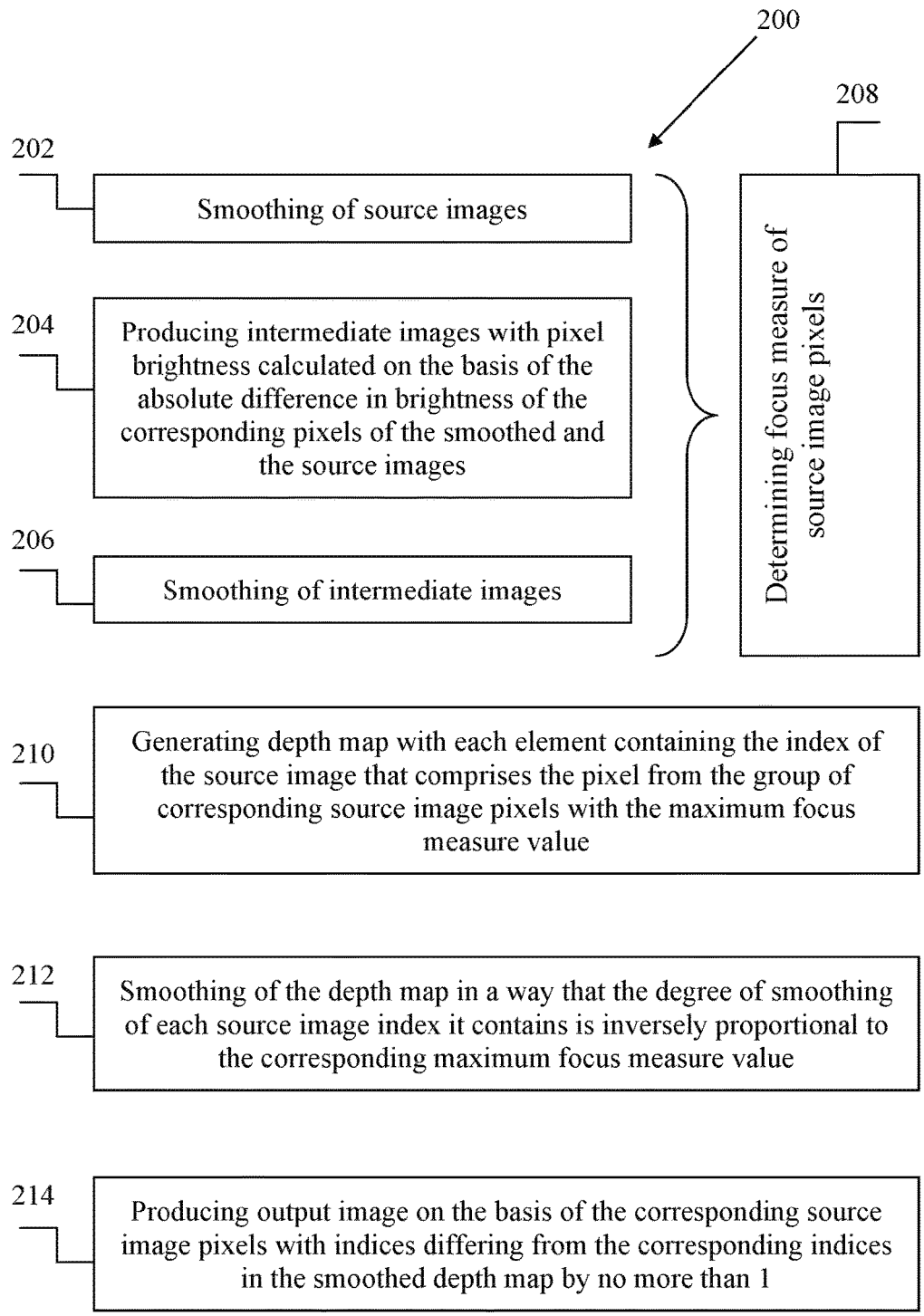
FIG. 2 is a block diagram of an example implementation of the method of producing an output image with extended depth of field according to one of the preferred embodiments of the present invention.

FIG. 2 depicts a block diagram of an example implementation of the method 200 of generation of the output image with extended depth of field according to one of the preferred embodiments of the present invention. Said method 200 comprises examples of specific steps of implementation of the output image creation method. Certain steps of the method 200 or the entire method 200 (or any other processes described herein, or variations and/or combinations thereof) can be implemented under control of one or several computer systems set up using executable instructions, and can be presented as program instructions (for instance, as computer code, one or several computer programs or one or several applications) executable collectively by one or several processors, hardware or the combination thereof. Program instructions can be stored on one or more computer readable media, for instance, as a computer program containing multiple instructions executed by one or more processors. Computer readable information storage medium is a non-transitory one.

Block diagram of the method 200 begins with the block 202 illustrating the step of smoothing of each source image.

Source images can be preliminary aligned and uniformed. Alignment process consists in transformation of different image data sets in a way that all the source images of the group are characterized by the same coordinate system. Source image alignment allows to process both the images of the same size and similar content, and those of different size obtained from different sources. Alignment of source images includes identifying one-to-one correspondence of the pixels of one image to the pixels of another one. In the present application such pixels are called corresponding pixels. In each case similarity of the contents of images should be sufficient to allow for merging or aligning them relative to the other images of the group, which is described in the present application as "images of substantially the same scene". And each source image of the group is characterized by an index number. Commonly an index has a value from 0 to N, wherein N≥1, though other numbering options are also possible. Then intermediate images are created according to the block 204. Thus, each source image has a corresponding intermediate image, and brightness of each pixel of each intermediate image is calculated as an absolute difference in brightness of corresponding pixels of the smoothed and the source images.

Then, according to the block 206, each of the created intermediate images is smoothed. Three blocks 202-206 considered above describe one of the preferred embodiments of the calculation method of the focus measure for each pixel of each source image illustrated in this block diagram as a block 208. Thus, the focus measure of the source image pixel is the obtained value of brightness of the corresponding pixel of the smoothed intermediate image.

Next step is creation of the depth map as described in the block 210 of the block diagram. Depth map may constitute a two-dimensional matrix with each element containing index of the source image that comprises the pixel from the group of corresponding pixels of source images, which corresponds to the maximum value of the focus measure.

Then, according to the block 212, the depth map is smoothed in a way that the smoothing degree of each source image index it contains is inversely proportional to the corresponding maximum focus measure value. This kind of special processing of the depth map smooths the transition between the regions with different source images indices. The elements of the smoothed depth map, i.e. the smoothed indices, can thus contain both integer and fractional values.

After smoothing of the depth map according to the block 214 the output image is produced using corresponding pixels of source images with indices differing from the corresponding index of the smoothed depth map by no more than 1. Hence, each pixel of the output image is generated on the basis of corresponding pixels of source images, no more than two source images being used for this. So in case when the element of the smoothed depth map contains integer index value, the pixel of the output image is produced using the pixel of the source image with the specified integer index; in case when the element of the smoothed depth map contains fractional index value, the pixel of the output image is created using pixels of two source images with indices differing from the corresponding indices in the smoothed depth map by no more than 1. For instance, if the element of the smoothed depth map contains the index value 0.5, the output pixel will be generated using source images that the indices 0 and 1 Correspond to (with source image index values from 0 to N, wherein N≥1).

Figure 3A:
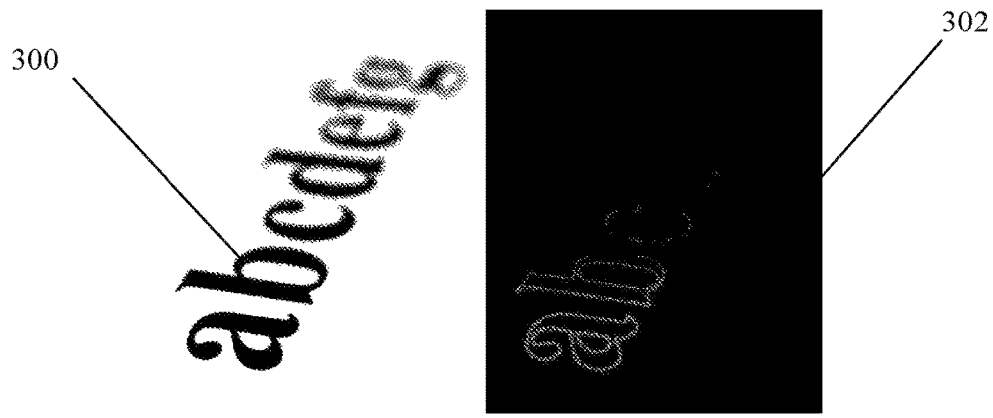
FIG. 3A-3C is an example of source images and corresponding smoothed intermediate images created according to one of the preferred embodiments of the present invention.
Figure 3B:
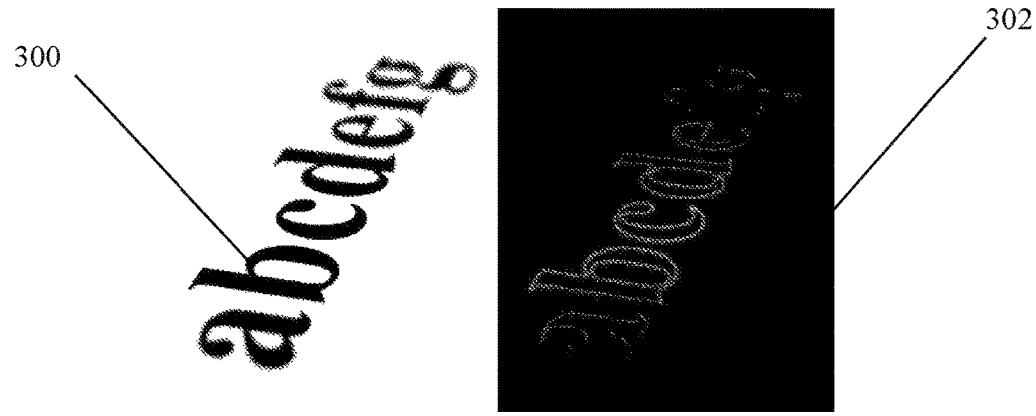
Figure 3C:
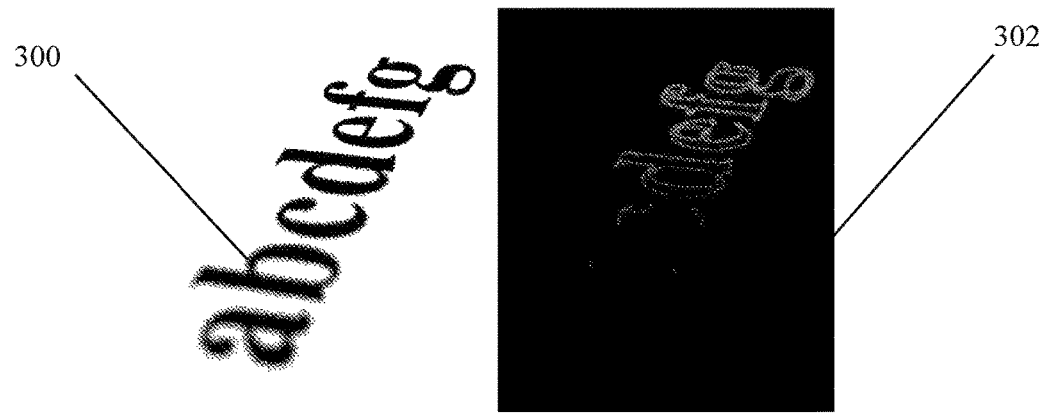

FIG. 3A-3C depict an example of three source images 300 (grayscale represented as a dot pattern). It is apparent that in the source image 300 on the FIG. 3A the substantially most focused region is the one with the letter a; the substantially most focused region in the source image 300 in the FIG. 3B is the one with the letters b, c and d; the substantially most focused region of the source image 300 in the FIG. 3C is the one with the letters e, f, g. In order to produce an output image where all the letters (a, b, c, d, e, f, g) will be in focus the method described in the block diagram in the FIG. 2 was implemented.

FIG. 3A depicts that each source image 300 has a corresponding smoothed intermediate image 302 produced according to the steps described in the blocks 202-206 of the block diagram.

Figure 4:
FIG. 4 is an example of a depth map created according to one of the preferred embodiments of the present invention.
Figure 5:
FIG. 5 is an example of a depth map smoothed according to one of the preferred embodiments of the present invention.

FIG. 4 depicts the depth map 400 created according to the step described in the block 210 of the block diagram, and FIG. 5 depicts the depth map 500 smoothed according to the step described in the block 212 of the block diagram.

Figure 6:
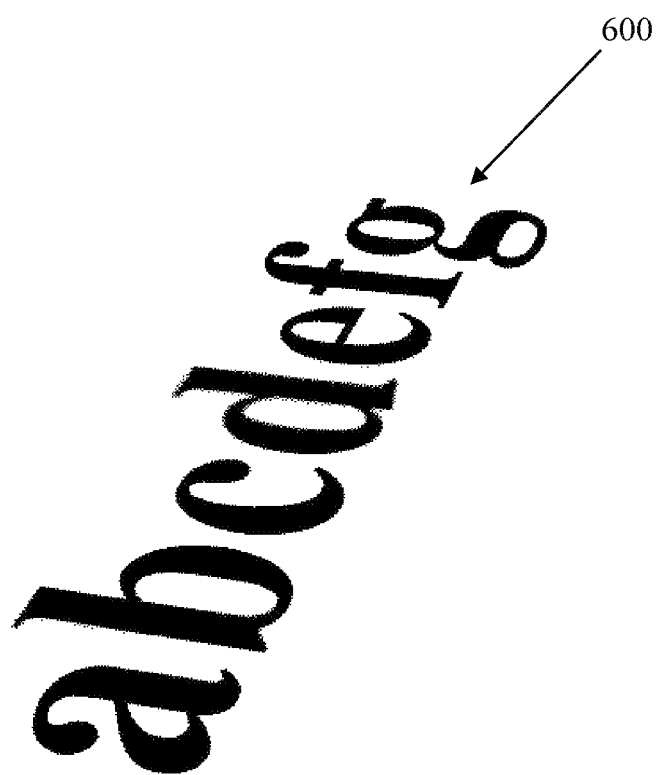
FIG. 6 is an example of an output image created according to one of the preferred embodiments of the present invention.

FIG. 6 depicts the output image 600 produced according to the step described in the block 214 of the block diagram. All the letters (a, b, c, d, e, f, g) in the specified output image 600 are in focus.

Although the examples of the method of producing the output image were described in a language specific to the structural features and/or methodological steps, it should be understood that the method of producing the output image as defined in the appended claims is not necessarily limited to the specific features or steps described above. Rather, the specific features and steps described above are disclosed as examples of implementing the claims, and other equivalent features and steps can be encompassed by the claims of the present invention.

The invention claimed is:

1. A method of producing an output image with extended depth of field from a group of at least two source images of substantially the same scene, captured with a shift of depth of field, comprising:
   determining focus measure of source image pixels, wherein determining focus measures comprises smoothing of source images and producing intermediate images with pixel brightness calculated on the basis of the absolute difference in brightness of corresponding pixels of the smoothed and the source images;
   generating a depth map with elements containing source image indices;
   smoothing of the depth map in a way that the degree of smoothing of the source image indices it contains is inversely proportional to the corresponding maximum focus measure values;
   producing an output image using the smoothed depth map.

2. The method of claim 1, wherein determining focus measures comprises smoothing of intermediate images.

3. The method of claim 1, wherein the elements of the depth map contain indices of source images that comprise pixels from a group of corresponding source image pixels with the maximum focus measure value.

4. The method of claim 1, wherein the pixels of the output image are generated on the basis of the corresponding source image pixels with indices differing from the corresponding indices in the smoothed depth map by no more than 1.

5. A computer system comprising
   at least one processor,
   at least one computer readable medium communicatively connected with at least one processor, and
   program instructions for producing the output image with extended depth of field from a group of at least two source images of substantially the same scene, captured with a shift of depth of field, stored on at least one computer readable medium and executable by at least one processor, comprising
   program instructions for determining focus measures of source images pixels, wherein the program instructions for determining the focus measure comprise instructions for smoothing of source images and producing intermediate images with pixel brightness calculated on the basis of the absolute difference in brightness of the corresponding pixels of the smoothed and the source images;
   program instructions for generation of the depth map with elements containing source image indices;
   program instructions for smoothing of the depth map in a way that the degree of smoothing of the source image indices it contains is inversely proportional to the corresponding maximum focus measure values;
   program instructions for producing the output image using the smoothed depth map.

6. The system of claim 5, wherein the program instructions for determining the focus measure comprise instructions for intermediate image smoothing.

7. The system of claim 5, wherein the program instructions for creation of the depth map comprise instructions for creation of the depth map with elements containing indices of source images that comprise pixels from the group of corresponding pixels of source images with the maximum focus measure values.

8. The system of claim 5, wherein the program instructions for producing the output image comprise instructions for generating pixels of the output image on the basis of the corresponding pixels of source images with indices differing from the corresponding indices in the smoothed depth map by no more than 1.

9. One or more non-transitory computer readable storage medium comprising
   stored program instructions for producing the output image with extended depth of field from a group of at least two source images of substantially the same scene captured with a shift of depth of field, comprising
   program instructions for determining focus measures of the source image pixels, wherein the program instructions for determining the focus measures comprise instructions for smoothing of source images and producing intermediate images with pixel brightness calculated on the basis of the absolute difference in brightness of corresponding pixels of the smoothed and the source images;
   program instructions for creation of the depth map with elements containing source image indices;
   program instructions for smoothing of the depth map in a way that the degree of smoothing of the source image indices it contains is inversely proportional to the corresponding maximum focus measure values;
   program instructions for producing the output image using the smoothed depth map.

10. One or more non-transitory computer readable media of claim 9, wherein the program instructions for determining focus measures comprise instructions for smoothing of intermediate images.

11. One or more non-transitory computer readable media of claim 9, wherein the program instructions for depth map creation comprise instructions for creation of the depth map with elements containing indices of source images that comprise pixels from a group of corresponding pixels of source images with the maximum focus measure values.

12. One or more non-transitory computer readable media of claim 9, wherein the program instructions for producing the output image comprise instructions for generating pixels of the output image on the basis of the corresponding pixels of source images with indices differing from the corresponding indices in the smoothed depth map by no more than 1.

* * * * *